United States Patent
Mohammed et al.

(10) Patent No.: US 12,464,322 B2
(45) Date of Patent: Nov. 4, 2025

(54) SYSTEMS AND METHODS FOR PROVIDING DYNAMIC EDGE-BASED MULTICAST AND BROADCAST SERVICE FOR CONTENT PROVIDERS

(71) Applicant: Verizon Patent and Licensing Inc., Basking Ridge, NJ (US)

(72) Inventors: Mansoor Ali Shah Mohammed, Plano, TX (US); John J. Arky, Los Angeles, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 464 days.

(21) Appl. No.: 18/047,847

(22) Filed: Oct. 19, 2022

(65) Prior Publication Data
US 2024/0137731 A1 Apr. 25, 2024
US 2024/0236620 A9 Jul. 11, 2024

(51) Int. Cl.
*H04W 4/06* (2009.01)
*H04W 4/02* (2018.01)

(52) U.S. Cl.
CPC ............ *H04W 4/06* (2013.01); *H04W 4/025* (2013.01)

(58) Field of Classification Search
CPC .... H04W 4/06; H04W 4/025; H04N 21/6405; H04N 21/42202; H04N 21/41407; H04N 21/25435; H04N 7/17318; H04N 21/6408
USPC ........................................................ 370/329
See application file for complete search history.

(56) References Cited

U.S. PATENT DOCUMENTS

| | | | |
|---|---|---|---|
| 8,910,217 B2 | 12/2014 | Tijo et al. | |
| 10,187,496 B2* | 1/2019 | Garg | H04L 69/14 |
| 10,230,995 B2* | 3/2019 | Anwar | H04N 21/21805 |
| 11,032,582 B2 | 6/2021 | Mohammed et al. | |
| 2005/0010963 A1* | 1/2005 | Zeng | H04L 67/303 |
| | | | 725/139 |
| 2009/0106792 A1* | 4/2009 | Kan | H04N 21/472 |
| | | | 725/34 |
| 2009/0271832 A1* | 10/2009 | Park | H04N 21/6408 |
| | | | 725/98 |
| 2009/0293090 A1* | 11/2009 | Quigley | H04N 21/6405 |
| | | | 725/62 |
| 2011/0225417 A1* | 9/2011 | Maharajh | H04L 65/752 |
| | | | 713/150 |
| 2017/0230434 A1* | 8/2017 | Wang | H04L 65/765 |
| 2021/0029413 A1* | 1/2021 | Bilal | H04N 21/6405 |
| 2021/0075631 A1* | 3/2021 | Liao | H04M 15/8038 |
| 2021/0352443 A1* | 11/2021 | Matolia | H04W 76/10 |

(Continued)

*Primary Examiner* — Jean A Gelin

(57) ABSTRACT

A device may receive content from an application server based on a user equipment (UE) generating a request to view the content over a unicast bearer, and may store the content in a temporary data structure. The device may receive a redirected request to view the content from the UE, and may provide the content over the unicast bearer to the UE based on the redirected request. The device may receive, from the UE, a unicast consumption of the content by the UE and a location of the UE, and may determine whether interest in the content for the location satisfies a threshold based on the unicast consumption. The device may initiate multicast and broadcast service (MBS) core functions with computing resources to utilize for an MBS for the content at the location based on the interest in the content for the location satisfying the threshold.

20 Claims, 15 Drawing Sheets

(56) References Cited

U.S. PATENT DOCUMENTS

2021/0352444 A1* 11/2021 Griot ................. H04W 28/0268
2023/0275949 A1*  8/2023 Kwon .................. H04L 65/612
                                                             709/227

* cited by examiner

SYSTEMS AND METHODS FOR PROVIDING DYNAMIC EDGE-BASED MULTICAST AND BROADCAST SERVICE FOR CONTENT PROVIDERS

BACKGROUND

Fifth generation (5G) multicast and broadcast service (MBS) is a point-to-multipoint service that can improve network efficiency and user experience when transmitting the same content to multiple users. A design principle of 5G MBS is to minimize an implementation impact of the feature by reusing as much as possible 5G unicast architecture and functions.

DETAILED DESCRIPTION OF EXAMPLE EMBODIMENTS

Figure 1A:
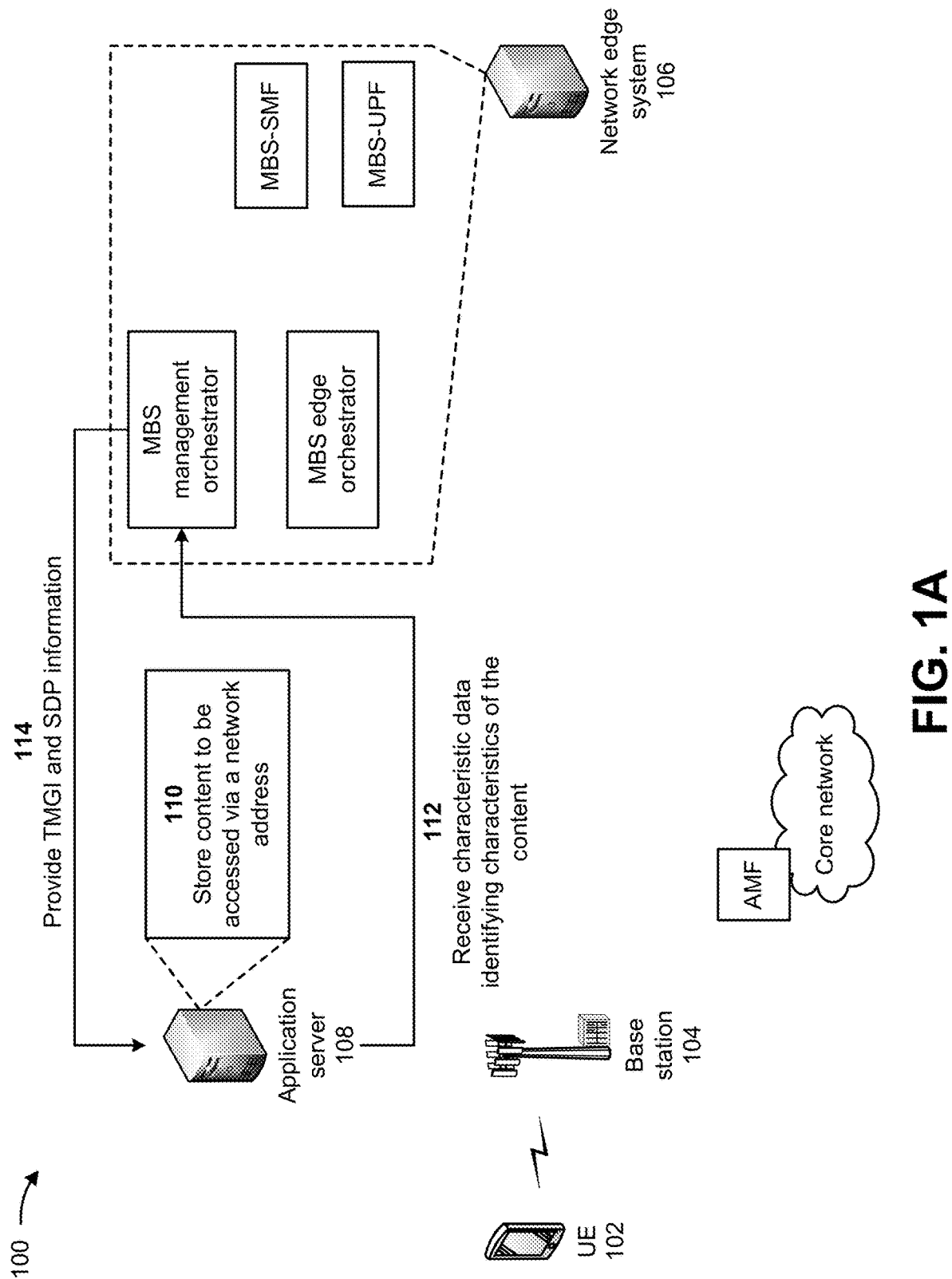
FIGS. 1A-1L are diagrams of an example associated with providing dynamic edge-based MBS for content providers.

The following detailed description of example implementations refers to the accompanying drawings. The same reference numbers in different drawings may identify the same or similar elements.

Live media streaming delivered over wireless networks is distributed using transmission control protocols in what is described as a "unicast" transport (e.g., a one-to-one relationship between a requesting user equipment (UE) and a network delivery source). A method of media delivery over wireless networks known as "multicast" delivery has evolved, which is a one-to-many delivery of content to multiple UEs via a single transport. While all wireless content delivery today is achieved via "unicast" connectivity, in a live video streaming scenario such transmission can be inefficient if multiple users in a given area are all interested in viewing the same content at the same time. There are two technologies that facilitate media streaming in 5G networks, 5G MBS and edge content caching. 5G MBS may be utilized for multicast transmission of data in situations where there is common interest in particular content, such as a live streaming video or a pre-packaged set of data files. Edge content caching is a form of content distribution that enables a proxy server to cache requested content and serve that content more closely to an end user. Edge content caching facilitates unicast delivery more closely to the requesting entities by serving the unicast content at the edge of the network. However, 5G MBS and edge content caching operate independently.

Thus, current techniques for delivering content consume computing resources (e.g., processing resources, memory resources, communication resources, and/or the like), networking resources, and/or other resources associated with inefficiently providing content to multiple users in a particular location that are all interested in viewing the same content at the same time, utilizing unicast transport of content to multiple users in a particular location, independently utilizing 5G MBS and edge content caching, providing a poor user experience to multiple users requesting the same content, and/or the like.

Some implementations described herein provide a network edge system that provides dynamic edge-based MBS for content providers. For example, the network edge system may receive content from an application server based on a UE generating a request to view the content over a unicast bearer, and may store the content in a temporary data structure. The network edge system may receive a redirected request to view the content from the UE, and may provide the content over the unicast bearer to the UE based on the redirected request. The network edge system may receive, from the UE, a unicast consumption of the content by the UE and a location of the UE, and may determine whether interest in the content for the location satisfies a threshold based on the unicast consumption (e.g., whether a quantity of requests for the content at the location is greater than a threshold quantity warranting an MBS for the content at the location). The network edge system may initiate MBS core functions with computing resources to utilize for an MBS for the content at the location based on the interest in the content for the location satisfying the threshold, and may provision the MBS core functions based on provisioning information. The network edge system may notify the application server that the MBS is ready for the content at the location based on provisioning the MBS core functions, and may instruct the MBS core functions to start the MBS for the content.

In this way, the network edge system provides dynamic edge-based MBS for content providers. For example, the network edge system may provide an edge-based complementary system with defined communication methods that facilitate intelligent decision making that enables either 5G MBS or edge content caching at appropriate times. In a real-time video streaming scenario, the network edge system may deploy both technologies in a 5G network in a codependent manner, where edge content caching traffic may be monitored and may provide thresholds to trigger an MBS based on consumption patterns, thus reducing over-the-air network congestion and providing high quality and low latency to consumers. Thus, the network edge system may conserve computing resources, networking resources, and/or other resources that would have otherwise been consumed by inefficiently providing content to multiple users in a particular location that are all interested in viewing the same content at the same time, utilizing unicast transport of content to multiple users in a particular location, independently utilizing 5G MBS and edge content caching, providing a poor user experience to multiple users requesting the same content, and/or the like.

FIGS. 1A-1L are diagrams of an example 100 associated with providing dynamic edge-based MBS for content providers. As shown in FIGS. 1A-1L, example 100 includes a UE 102 and a base station 104 associated with a core network, a network edge system 106, and an application server 108. In some implementations, the core network may include an example functional architecture in which systems and/or methods described herein may be implemented. For example, the core network may include an example architecture of a 5G next generation (NG) core network included in a 5G wireless telecommunications system. While the core network may be a service-based architecture, in some implementations, the core network may be implemented as a reference-point architecture and/or a fourth generation (4G) core network, among other examples.

The core network may include a number of functional elements, such as an access and mobility management function (AMF). The AMF includes one or more devices that act as a termination point for non-access stratum (NAS) signaling and/or mobility management, among other examples. The network edge system 106 may include an MBS management orchestrator, an MBS transition proxy, an MBS edge orchestrator, an edge content caching node (ECCN) client, an MBS-session management function (SMF), and an MBS-user plane function (UPF).

The MBS management orchestrator may be a master controller function for MBS within the core network and may enable content providers to manage content. The MBS transition proxy may reside in an operator edge compute instance and may include an interface with the ECCN client for orchestration. The MBS edge orchestrator may reside in the operator edge compute instance and may be either public or private. The MBS edge orchestrator may include a 3GPP-based interface with the MBS management orchestrator and may include application programming interfaces (APIs) to instantiate 5G MBS network functions when there is a demand for the MBS. Since edge compute resources are valuable, the MBS edge orchestrator may enable efficient usage of edge compute resources and may provide a best end user MBS experience.

The ECCN client may include a data structure (e.g., a database, a table, a list, and/or the like) for temporarily storing content received from the application server 108. The MBS-SMF includes one or more devices that support the establishment, modification, and release of communication sessions in the wireless telecommunications system. For example, the MBS-SMF may configure traffic steering policies at the MBS-UPF and/or may enforce UE Internet protocol (IP) address allocation and policies, among other examples. The MBS-UPF includes one or more devices that serve as an anchor point for intra radio access technology (intraRAT) and/or interRAT mobility. The MBS-UPF may apply rules to packets, such as rules pertaining to packet routing, traffic reporting, and/or handling user plane quality of service (QoS), among other examples.

The MBS-SMF and the MBS-UPF may be referred to together as MBS core functions. The MBS core functions may be provided in containerized services in virtualized software environments. The MBS core functions may be deployed in cloud computing environments (e.g., a network edge environment), and may be co-deployed in areas where ECCN clients exist in multi-access edge computing (MEC) environments. The MBS core functions may be initialized in an orchestrated fashion. Signaling of service start and teardown procedures may be provided for the MBS core functions to gracefully orchestrate service enablement and de-enablement. Communication between the MBS management orchestrator and the MBS edge orchestrator may be provided to automate these service flows.

Further details of the UE 102, the base station 104, the network edge system 106, the application server 108, the core network, the AMF, the MBS management orchestrator, the MBS transition proxy, the MBS edge orchestrator, the ECCN client, the MBS-SMF, and the MBS-UPF are provided elsewhere herein.

As shown in FIG. 1A, and by reference number 110, the application server 108 may store content to be accessed via a network address. For example, the application server 108 may be managed by an application service provider that is a consumer of the MBS. The application server 108 may include an interface with the network edge system 106 to enable self-managed scheduling of the MBS, provide necessary service provisioning parameters, retrieve information that enable the UE 102 to negotiate an MBS with mobile device middleware. MBS interface definitions may be exercised on the interface, and the application server 108 may also include custom interfaces. Communication between the application server 108 and the network edge system 106 may automate the service flows.

The application server 108 may provide a mobile application that enables the UE 102 to access content associated with the mobile application. In some implementations, the application server 108 may store the content associated with the mobile application in a data structure associated with the application server 108. The mobile application may communicate with mobile device middleware. The application server 108 may communicate with the mobile application to convey MBS parameters and to signal when a service start can occur. In some implementations, the mobile application may communicate with mobile device middleware in order to activate or deactivate the MBS based on instructions received from the application server 108. Communication between the mobile application and the mobile device middleware may provide MBS parameters and requests for service start and/or service end.

In some implementations, the application service provider may create and deploy the content in the application server 108. The application server 108 may store the content in a content data network (CDN), and may configure a program guide that is delivered to the mobile application executing on the UE 102. The program guide may include a network address (e.g., a uniform resource locator (URL)) that, when selected, may cause the UE 102 to retrieve the content stored at the application server 108.

As further shown in FIG. 1A, and by reference number 112, the MBS management orchestrator of the network edge system 106 may receive characteristic data identifying characteristics of the content from the application server 108. For example, the application server 108 may generate the characteristic data identifying the characteristics of the content stored at the application server 108. The characteristics of the content may include characteristics indicating when, where, and how a content streaming session may occur with the application server 108. The application server 108 may provide the characteristic data to the network edge system 106, and the network edge system 106 may receive the characteristic data. In some implementations, the MBS management orchestrator of the network edge system 106 may receive the characteristic data from the application server 108.

As further shown in FIG. 1A, and by reference number 114, the MBS management orchestrator of the network edge system 106 may provide temporary mobile group identity (TMGI) and session description protocol (SDP) information to the application server 108. For example, the MBS management orchestrator of the network edge system 106 may generate a TMGI and SDP information based on receiving the characteristic data. The TMGI may include a radio resource efficient mechanism for identifying an MBS. The TMGI for a specific MBS may be provided to the UE 102 during the MBS activation procedure. The SDP information may include information describing multimedia communication sessions (e.g., the MBS) for the purposes of announcement and invitation. The MBS management orchestrator of the network edge system 106 may provide the TMGI and the SDP information to the application server 108, and the application server 108 may receive the TMGI and the SDP information.

Figure 1B:
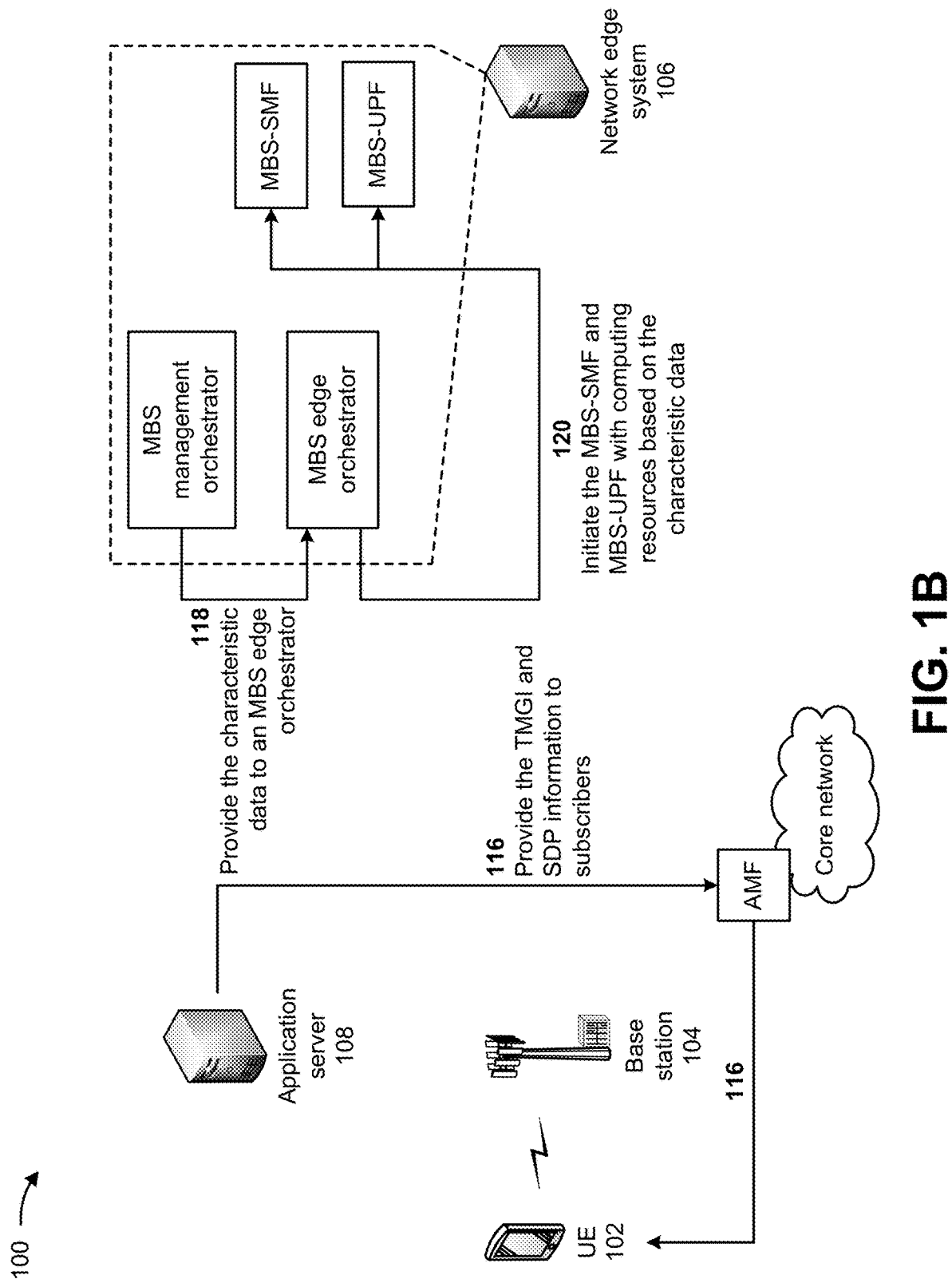

As shown in FIG. 1B, and by reference number 116, the application server 108 may provide the TMGI and the SDP information to subscribers (e.g., to UEs 102) via the AMF of the core network. For example, the application server 108 may provide the TMGI and the SDP information to subscribers of the mobile application provided by the application server 108. In some implementations, the UE 102 may be a subscriber to the mobile application. The application server 108 may provide the TMGI and the SDP information to the core network (e.g., to the AMF of the core network), and the core network may provide the TMGI and the SDP information to the subscribers of the mobile application (e.g., the UE 102). The UE 102 may utilize the TMGI and the SDP information to access the content via the MBS.

As further shown in FIG. 1B, and by reference number 118, the MBS management orchestrator of the network edge system 106 may provide the characteristic data to the MBS edge orchestrator of the network edge system 106. For example, MBS management orchestrator of the network edge system 106 may identify an MBS edge orchestrator closest to the subscribers (e.g., the UE 102), and may provide the characteristic data to the identified MBS edge orchestrator. The MBS edge orchestrator of the network edge system 106 may receive the characteristic data from the MBS management orchestrator.

As further shown in FIG. 1B, and by reference number 120, the MBS edge orchestrator of the network edge system 106 may initiate the MBS-SMF and the MBS-UPF with computing resources based on the characteristic data. For example, based on the characteristic data, the MBS edge orchestrator of the network edge system 106 may instantiate the MBS-SMF and the MBS-UPF with a quantity of edge computing resources required to provide the MBS for the content. The quantity of edge computing resources of the MBS-SMF and the MBS-UPF may provide the content to the subscribers when, where, and how a content streaming session may occur with the application server 108.

Figure 1C:
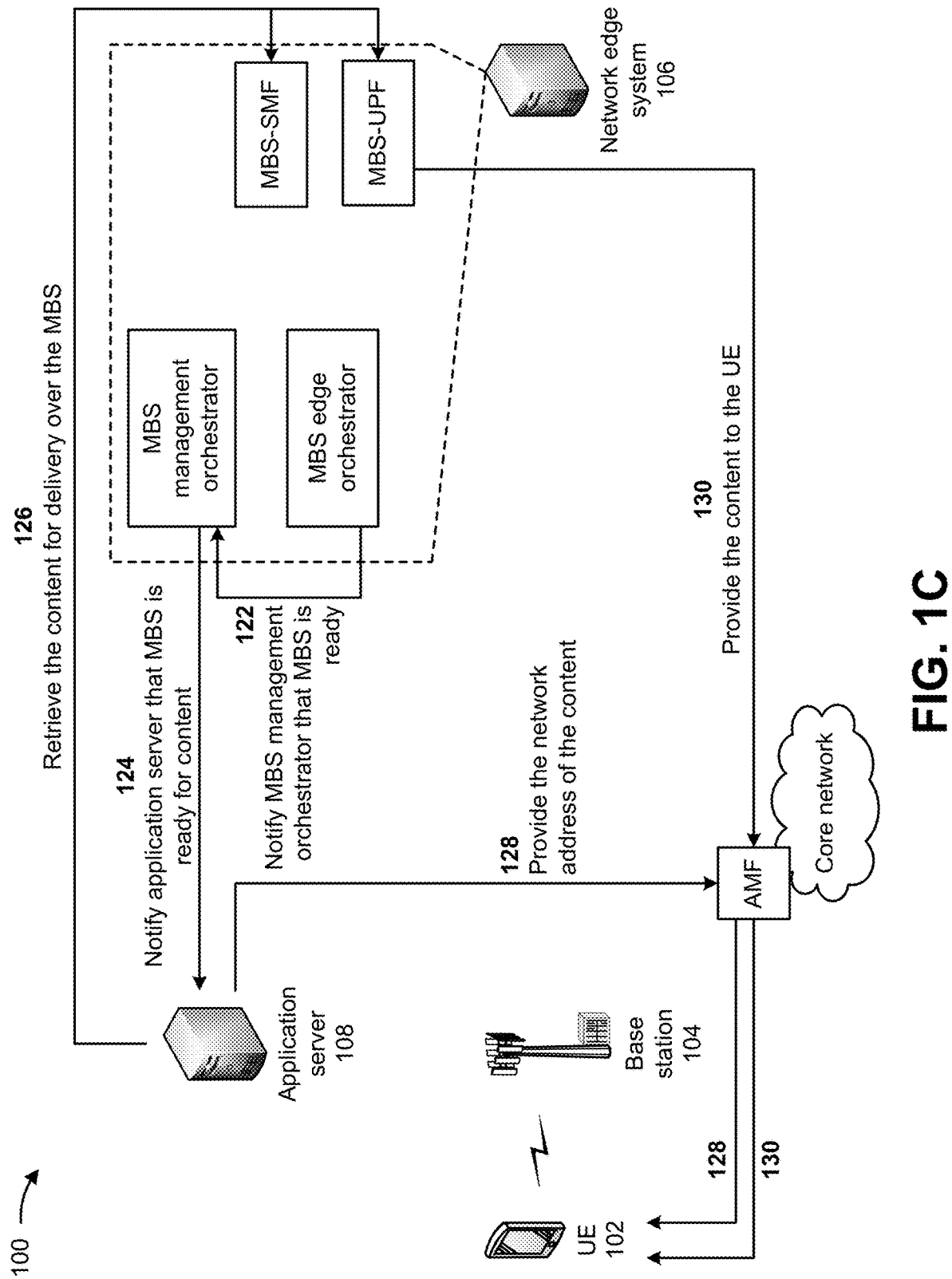

As shown in FIG. 1C, and by reference number 122, the MBS edge orchestrator of the network edge system 106 may notify the MBS management orchestrator that an MBS is ready for the content. For example, once the computing resources of the MBS-SMF and the MBS-UPF are instantiated, the MBS may be ready for the content. The MBS edge orchestrator may generate a notification indicating that the MBS is ready for the content, and may provide the notification to the MBS management orchestrator of the network edge system 106. The MBS management orchestrator may receive the notification from the MBS edge orchestrator.

As further shown in FIG. 1C, and by reference number 124, the MBS management orchestrator of the network edge system 106 may notify the application server 108 that the MBS is ready for the content. For example, the MBS management orchestrator of the network edge system 106 may generate a notification indicating that the MBS is ready for the content, and may provide the notification to the application server 108. The application server 108 may receive the notification from the MBS management orchestrator.

As further shown in FIG. 1C, and by reference number 126, the MBS-SMF and the MBS-UPF of the network edge system 106 may retrieve, from the application server 108, the content for delivery over the MBS. For example, the application server 108 may provide the network address of the content to the MBS-SMF and/or the MBS-UPF, and the MBS-SMF and/or the MBS-UPF may utilize the network address to retrieve the content from application server 108 (e.g., from the data structure associated with the applications server 108). In some implementations, the MBS-SMF and/or the MBS-UPF may store the content in a data structure associated with the MBS-SMF and/or the MBS-UPF.

As further shown in FIG. 1C, and by reference number 128, the application server 108 may provide the network address of the content to the UE 102 via the AMF of the core network. For example, the application server 108 may provide the network address of the content to the subscribers of the mobile application, via the core network (e.g., via the AMF). Since the UE 102 is a subscriber of the mobile application, the application server 108 may provide the network address of the content to the AMF, and the AMF may provide the network address of the content to the UE 102.

As further shown in FIG. 1C, and by reference number 130, the MBS-UPF of the network edge system 106 may provide the content to the UE 102 via the AMF of the core network. For example, after retrieving the content from the application server 108, the MBS-UPF of the network edge system 106 may provide the content to the AMF of the core network. The AMF may provide the content to the UE 102, and the UE 102 may receive the content from the AMF.

Figure 1D:
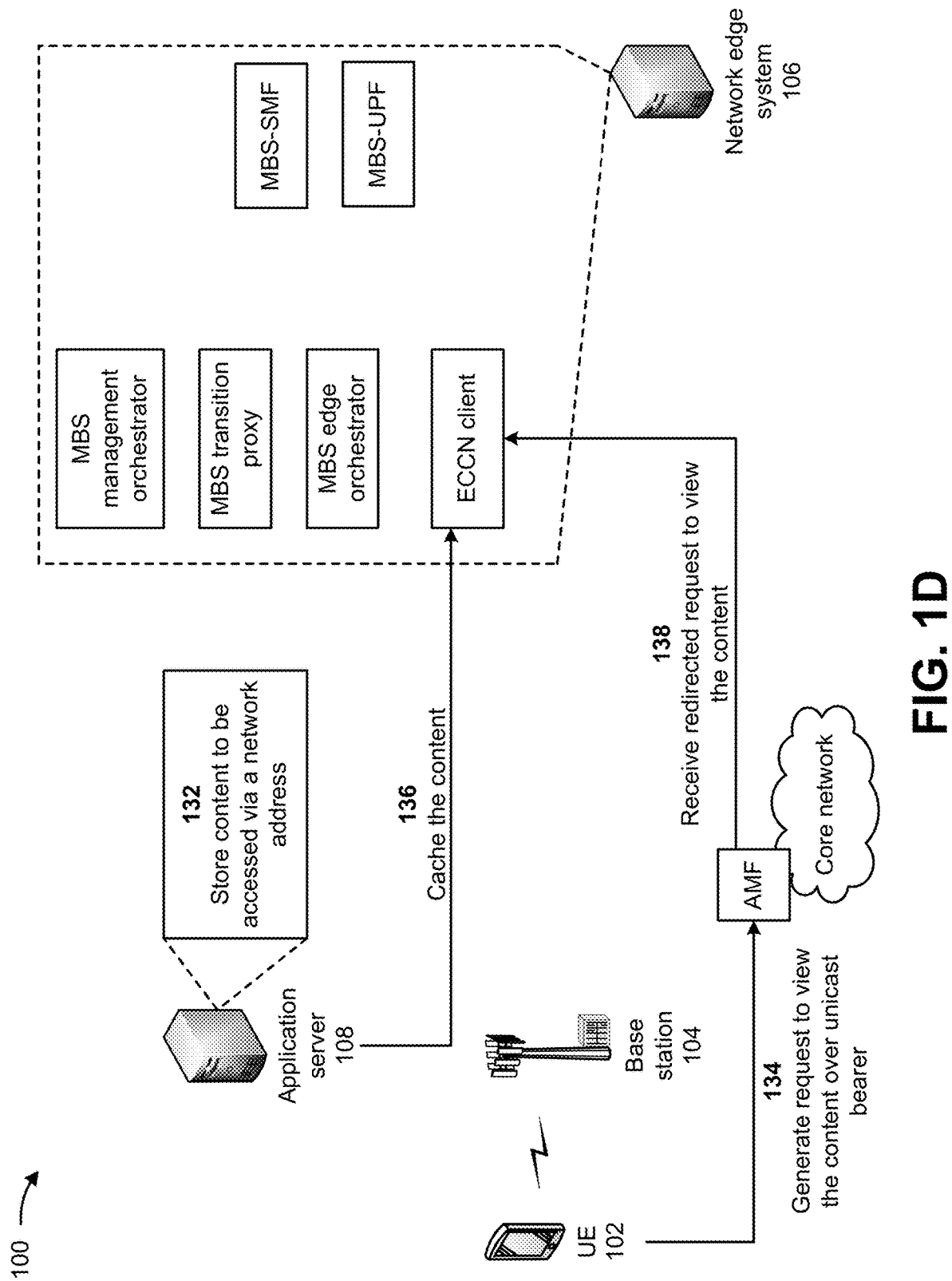

As shown in FIG. 1D, and by reference number 132, the application server 108 may store content to be accessed via a network address. For example, the application server 108 may provide the mobile application that enables the UE 102 to access the content associated with the mobile application. In some implementations, the application server 108 may store the content associated with the mobile application in the data structure associated with the application server 108. In some implementations, the application service provider may create and deploy the content in the application server 108. The application server 108 may store the content in the CDN, and may configure the program guide that is delivered to the mobile application executing on the UE 102. The program guide may include the network address (e.g., URL) that, when selected, may cause the UE 102 to retrieve the content stored at the application server 108.

As further shown in FIG. 1D, and by reference number 134, the UE 102 may generate a request to view the content over a unicast bearer. For example, the UE 102 may execute the mobile application and a user of the UE 102 may utilize the mobile application to generate the request to view the content. The UE 102 may utilize the network address of the content to request the content over the unicast bearer.

As further shown in FIG. 1D, and by reference number 136, the ECCN client of the network edge system 106 may receive and cache the content from the application server 108. For example, the ECCN client of the network edge system 106 may request the content from the application server 108, and may receive the content from the application server 108 based on the request. The ECCN client may temporarily cache (e.g., store) the content in the data structure associated with the ECCN client.

As further shown in FIG. 1D, and by reference number 138, the ECCN client of the network edge system 106 may receive a redirected request to view the content from the AMF of the core network. For example, the AMF of the core network may receive the request to view the content from the UE 102 (e.g., directed to the network address) and may generate the redirected request to view the content. The redirected request may be redirected from the network address to an identifier associated with the ECCN client of the network edge system 106. The ECCN client may receive the redirected request to view the content from the AMF of the core network.

Figure 1E:
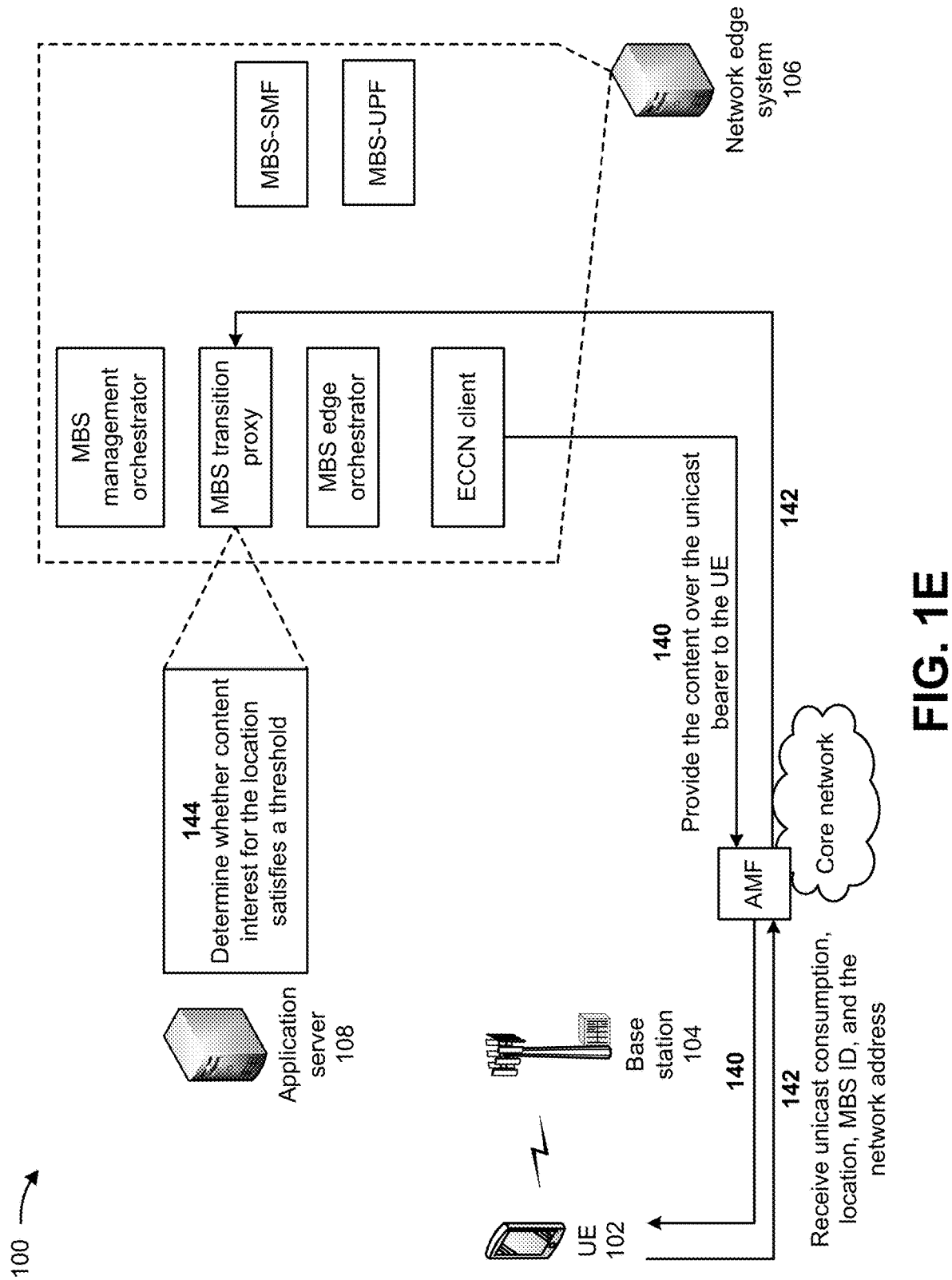

As shown in FIG. 1E, and by reference number 140, the ECCN client of the network edge system 106 may provide the content over the unicast bearer to the UE 102, via the AMF of the core network. For example, based on the redirected request to view the content, the ECCN client of the network edge system 106 may provide the content to the AMF of the core network. The AMF of the core network may provide the content over the unicast bearer to the UE 102.

As further shown in FIG. 1E, and by reference number 142, the MBS transition proxy of the network edge system 106 may receive, from the UE 102, a unicast consumption of the UE 102, a location of the UE 102, an MBS identifier (ID) associated with the content, and the network address associated with the content, via the AMF of the core network. For example, each of the subscribers (e.g., the UE 102) of the content may generate a report that includes the unicast consumption by the subscribers of the content, a location of the subscribers (e.g., the UE 102), the MBS ID associated with the content, and the network address associated with the content. The subscribers may provide the reports to the AMF of the core network, and the AMF may provide the reports to the MBS transition proxy of the network edge system 106.

As further shown in FIG. 1E, and by reference number 144, the MBS transition proxy of the network edge system 106 may determine whether content interest for the location satisfies a threshold. For example, the MBS transition proxy of the network edge system 106 may utilize the reports (e.g., unicast consumption of the content at the location) to determine a quantity of times the content is provided to subscribers in the location during a time period. The quantity of times the content is provided to the subscribers may provide an indication of the content interest for the location. The MBS transition proxy may determine whether the content interest for the location satisfies the threshold (e.g., a threshold quantity). In some implementations, the MBS transition proxy may determine that the content interest for the location fails to satisfy the threshold. In such instances, the network edge system 106 may continue to provide the content to the subscribers at the location via the unicast bearer. Alternatively, the MBS transition proxy may determine that the content interest for the location satisfies the threshold. In such instances, the network edge system 106 may determine that the content is to be provided to the location via MBS rather than the unicast bearer.

Figure 1F:
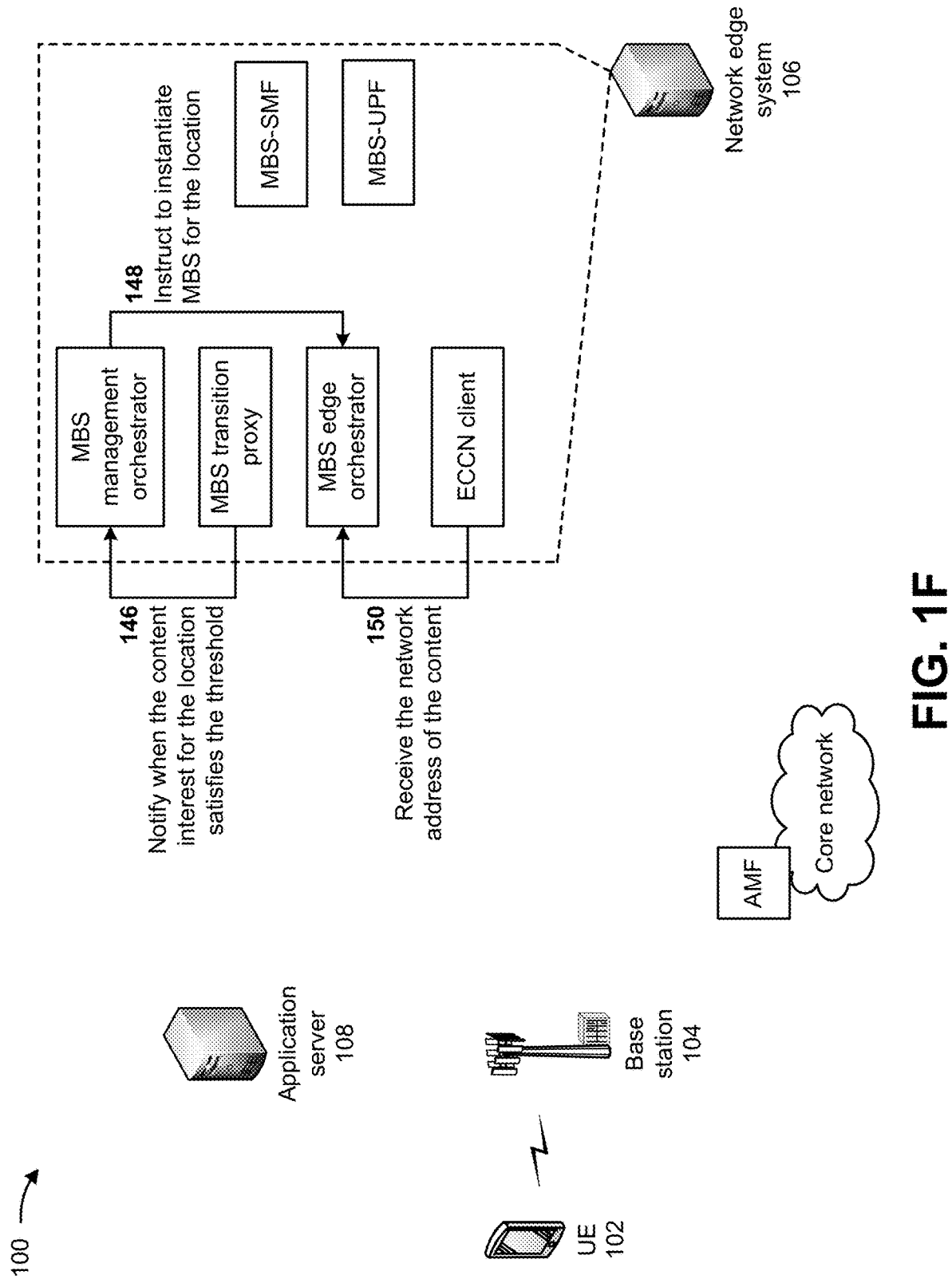

As shown in FIG. 1F, and by reference number 146, the MBS transition proxy of the network edge system 106 may notify the MBS management orchestrator when the content interest for the location satisfies the threshold. For example, when the MBS transition proxy determines that the content interest for the location satisfies the threshold, the MBS transition proxy may generate a notification indicating that the content interest for the location satisfies the threshold. The MBS transition proxy may provide the notification to the MBS management orchestrator of the network edge system 106, and the MBS management orchestrator may receive the notification.

As further shown in FIG. 1F, and by reference number 148, the MBS management orchestrator of the network edge system 106 may instruct the MBS edge orchestrator to instantiate the MBS for the location. For example, based on receiving the notification indicating that the content interest for the location satisfies the threshold, the MBS management orchestrator may instruct the MBS edge orchestrator of the network edge system 106 to instantiate the MBS for the content at the location. In some implementations, the instructions to the MBS edge orchestrator may include information identifying the location.

As further shown in FIG. 1F, and by reference number 150, the MBS edge orchestrator of the network edge system 106 may receive the network address of the content from the ECCN client. For example, based on receiving the instructions to instantiate the MBS for the content at the location, the MBS edge orchestrator of the network edge system 106 may request the network address of the content from the ECCN client. The ECCN client may provide the network address of the content to the MBS edge orchestrator based on the request, and the MBS edge orchestrator may receive the network address of the content from the ECCN client.

Figure 1G:
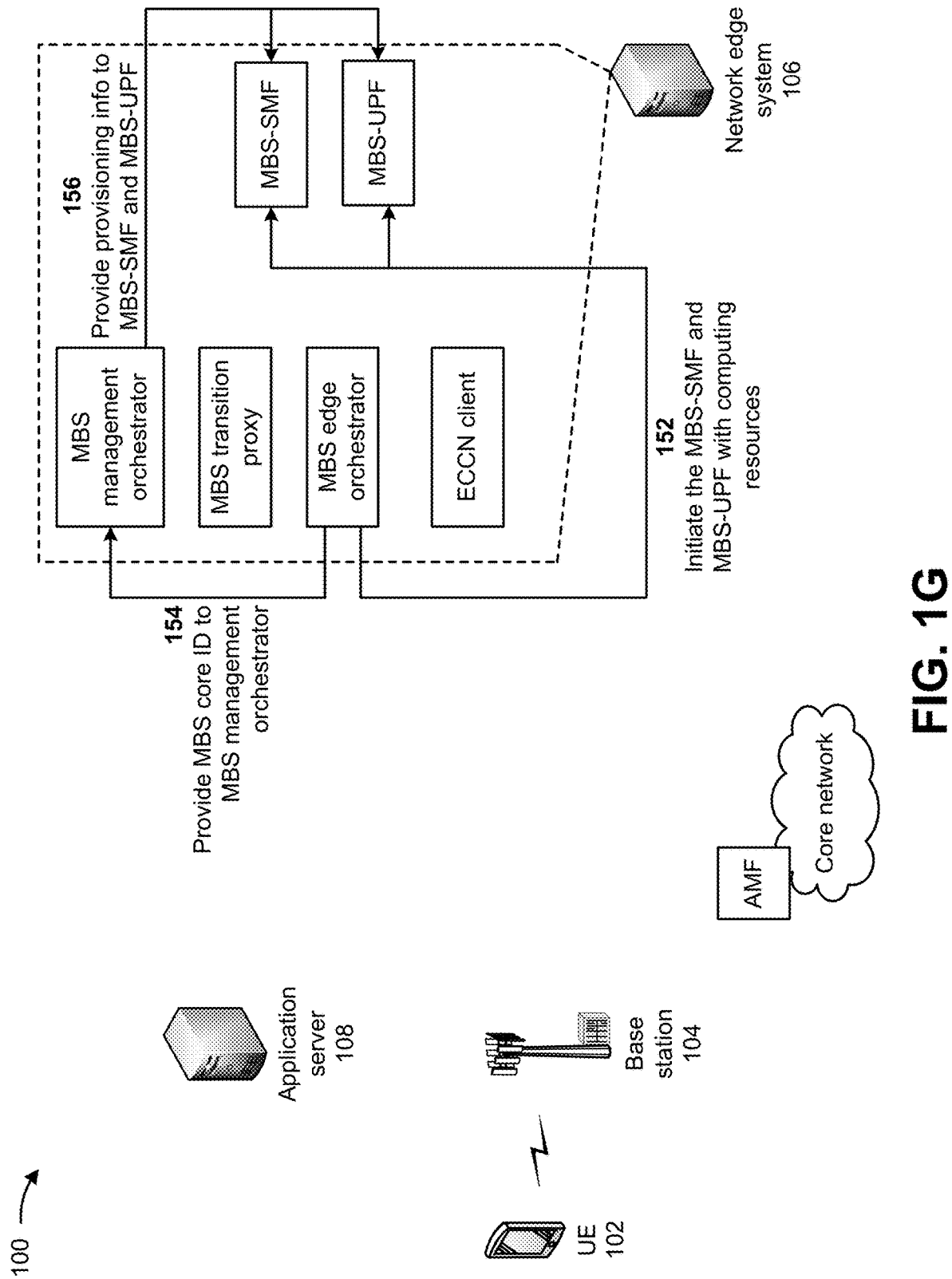

As shown in FIG. 1G, and by reference number 152, the MBS edge orchestrator of the network edge system 106 may initiate the MBS-SMF and the MBS-UPF with computing resources. For example, the MBS edge orchestrator of the network edge system 106 may instantiate the MBS-SMF and the MBS-UPF with a quantity of edge computing resources required to provide the MBS for the content at the location. The quantity of edge computing resources of the MBS-SMF and the MBS-UPF may provide the content to the subscribers when, where, and how a content streaming session may occur with the application server 108.

As shown in FIG. 1G, and by reference number 154, the MBS edge orchestrator of the network edge system 106 may provide the MBS core ID to the MBS management orchestrator. For example, the MBS edge orchestrator of the network edge system 106 may determine the MBS core ID associated with the MBS core functions (e.g., the MBS-SMF and the MBS-UPF), and may provide the MBS core ID to the MBS management orchestrator. The MBS management orchestrator may utilize the MBS core ID to communicate with the MBS-SMF and the MBS-UPF.

As further shown in FIG. 1G, and by reference number 156, the MBS management orchestrator of the network edge system 106 may provide provisioning information to the MBS-SMF and the MBS-UPF based on the MBS core ID. For example, the MBS management orchestrator of the network edge system 106 may generate provisioning information identifying how to provision the MBS for providing the content at the location. The MBS management orchestrator of the network edge system 106 may utilize the MBS core ID to provide the provisioning information to the MBS-SMF and the MBS-UPF. The MBS-SMF and the MBS-UPF may receive the provisioning information from the MBS management orchestrator.

Figure 1H:
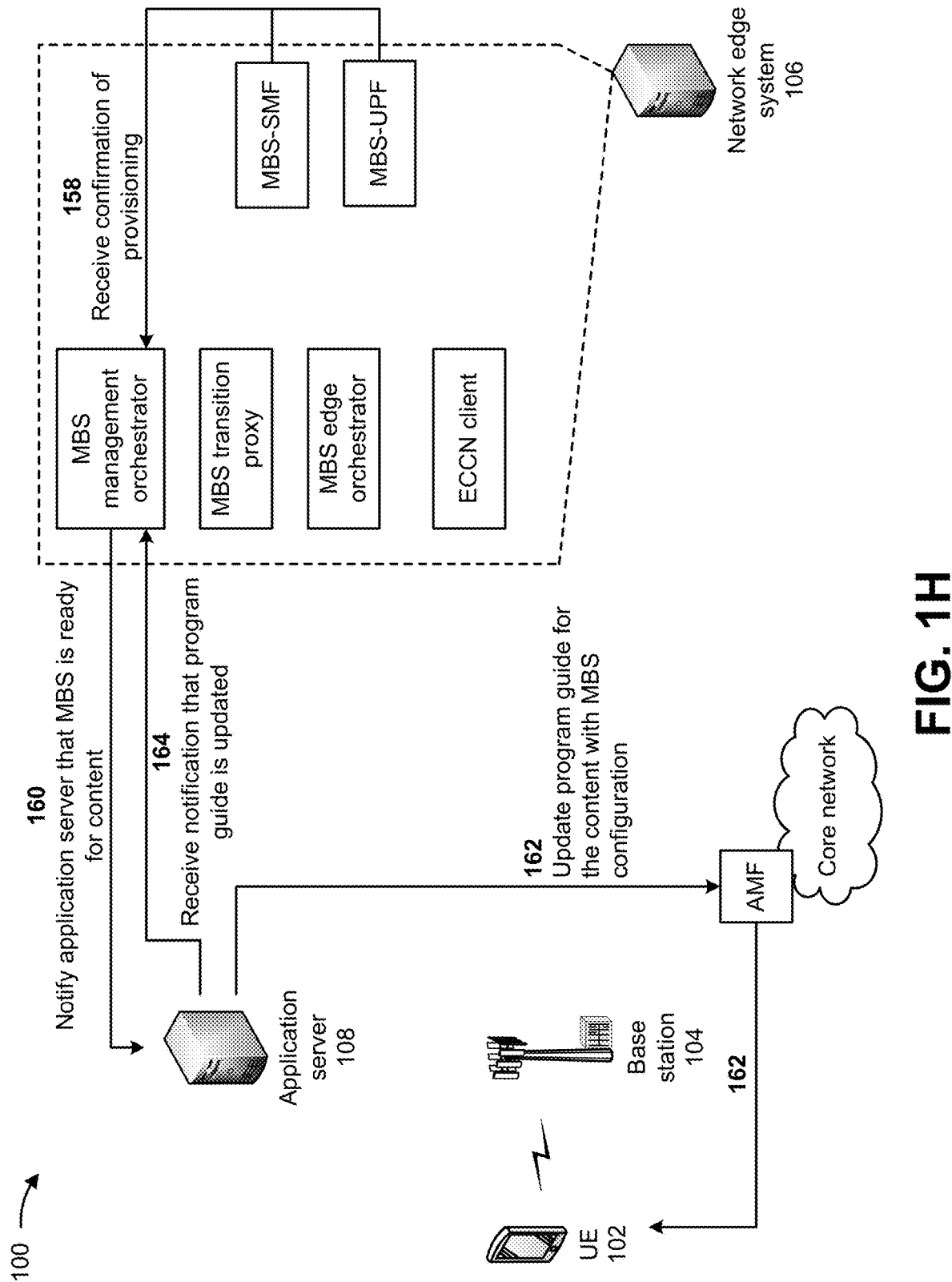

As shown in FIG. 1H, and by reference number 158, the MBS management orchestrator of the network edge system 106 may receive, from the MBS-SMF and the MBS-UPF, confirmation of the provisioning of the MBS-SMF and the MBS-UPF. For example, the MBS-SMF and the MBS-UPF may utilize the provisioning information to provision the MBS-SMF and the MBS-UPF for providing the MBS for the content at the location. After provisioning, the MBS-SMF and the MBS-UPF may generate the confirmation of the provisioning of the MBS-SMF and the MBS-UPF. The MBS-SMF and the MBS-UPF may provide the confirmation of provisioning to the MBS management orchestrator of the network edge system 106, and the MBS management orchestrator may receive the confirmation.

As further shown in FIG. 1H, and by reference number 160, the MBS management orchestrator of the network edge system 106 may notify the application server 108 that the MBS is ready for the content. For example, based on receiving the confirmation of provisioning, the MBS management orchestrator may determine that the MBS is ready for the content and may generate a notification indicating that the MBS is ready for the content. The MBS management orchestrator may provide the notification to the application server 108, and the application server 108 may receive the notification indicating that the MBS is ready for the content.

As further shown in FIG. 1H, and by reference number 162, the application server 108 may update a program guide for the content with an MBS configuration for the UE 102, via the AMF of the core network. For example, the application server 108 may update the program guide that is delivered to the mobile application executing on the UE 102. The program guide may include the MBS configuration (e.g., the TMGI, the SDP information, and/or the like) and the network address (e.g., URL) of the content that, when selected, may cause the UE 102 to retrieve the content stored at the application server 108.

As further shown in FIG. 1H, and by reference number 164, the MBS management orchestrator of the network edge system 106 may receive, from the application server 108, a notification that the program guide is updated for the content. For example, after updating the program guide for the content, the application server 108 may generate the notification indicating that the program guide is updated for the content. The application server 108 may provide the notification to the MBS management orchestrator of the network edge system 106, and the MBS management orchestrator may receive the notification indicating that the program guide is updated for the content.

Figure 1I:
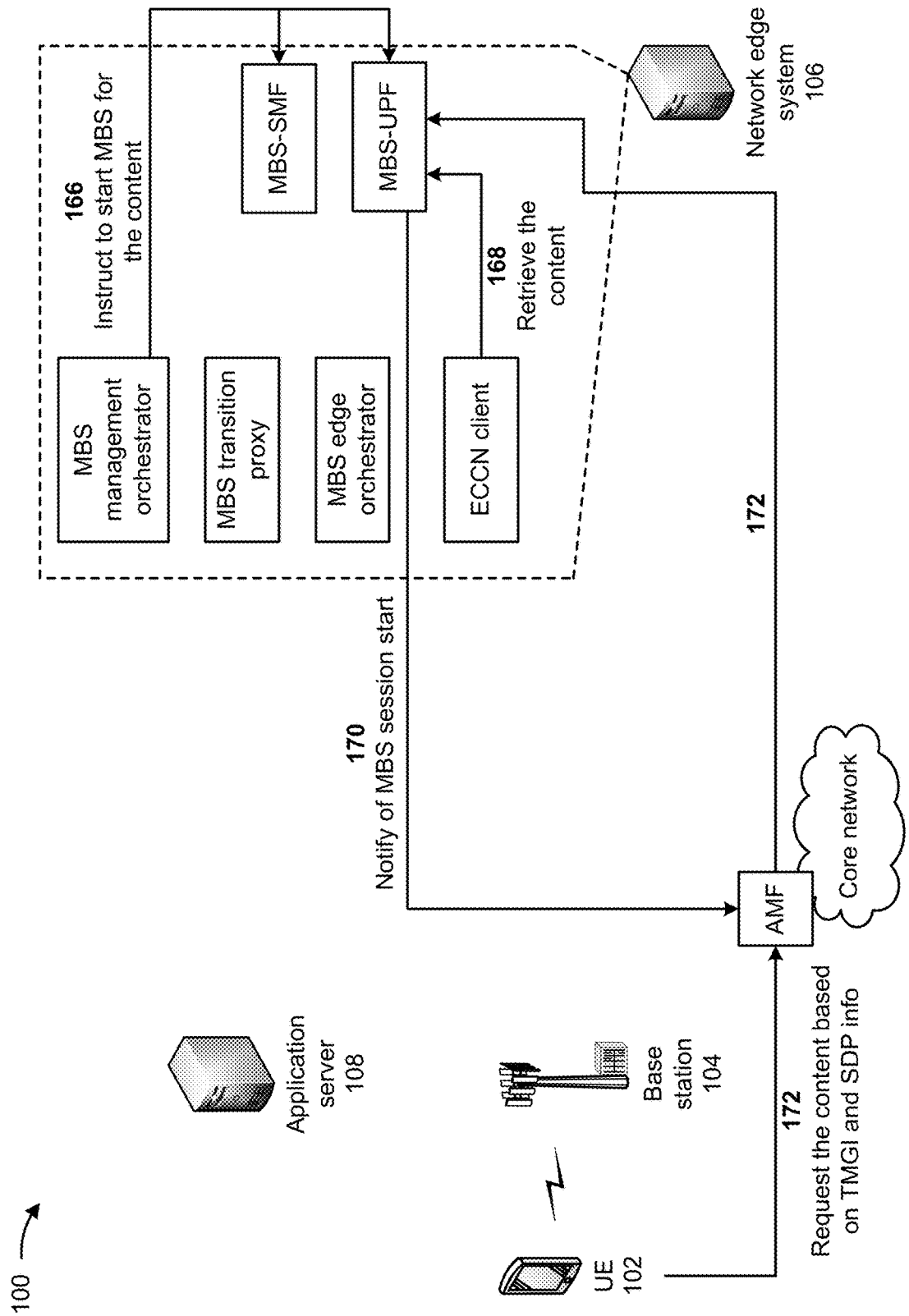

As shown in FIG. 1I, and by reference number 166, the MBS management orchestrator of the network edge system 106 may instruct the MBS-SMF and the MBS-UPF to start the MBS for the content. For example, after receiving the notification indicating that the program guide is updated for the content, the MBS management orchestrator of the network edge system 106 may instruct the MBS-SMF and the MBS-UPF to start the MBS for the content. The MBS-SMF and the MBS-UPF may start the UPF for the content based on the instruction from the MBS management orchestrator.

As further shown in FIG. 1I, and by reference number 168, the MBS-UPF of the network edge system 106 may retrieve the content from the ECCN client. For example, the MBS-UPF of the network edge system 106 may request the content from the ECCN client, and the ECCN client may provide the content to the MBS-UPF based on the request. The MBS-UPF may receive the content from the ECCN client.

As further shown in FIG. 1I, and by reference number 170, the MBS-UPF of the network edge system 106 may notify the AMF of the core network of the MBS session start. For example, after retrieving the content from the ECCN client, the MBS-UPF of the network edge system 106 may generate a notification of the MBS session start. The MBS-UPF may provide the notification of the MBS session start (e.g., via the control plane) to the AMF of the core network, the base station 104, and/or the like.

As further shown in FIG. 1I, and by reference number 172, the MBS-UPF of the network edge system 106 may receive, from the UE 102 and via the AMF of the core network, a request for the content based on the TMGI and SDP information. For example, the UE 102 may generate a request for the content that includes the TMGI and the SDP information. The TMGI and the SDP information may cause the request for the content to be routed to the MBS-UPF of the network edge system 106, via the AMF of the core network. The AMF of the core network may receive the request for the content, and may provide the request for the content to the MBS-UPF. The MBS-UPF may receive the request for the content.

Figure 1J:
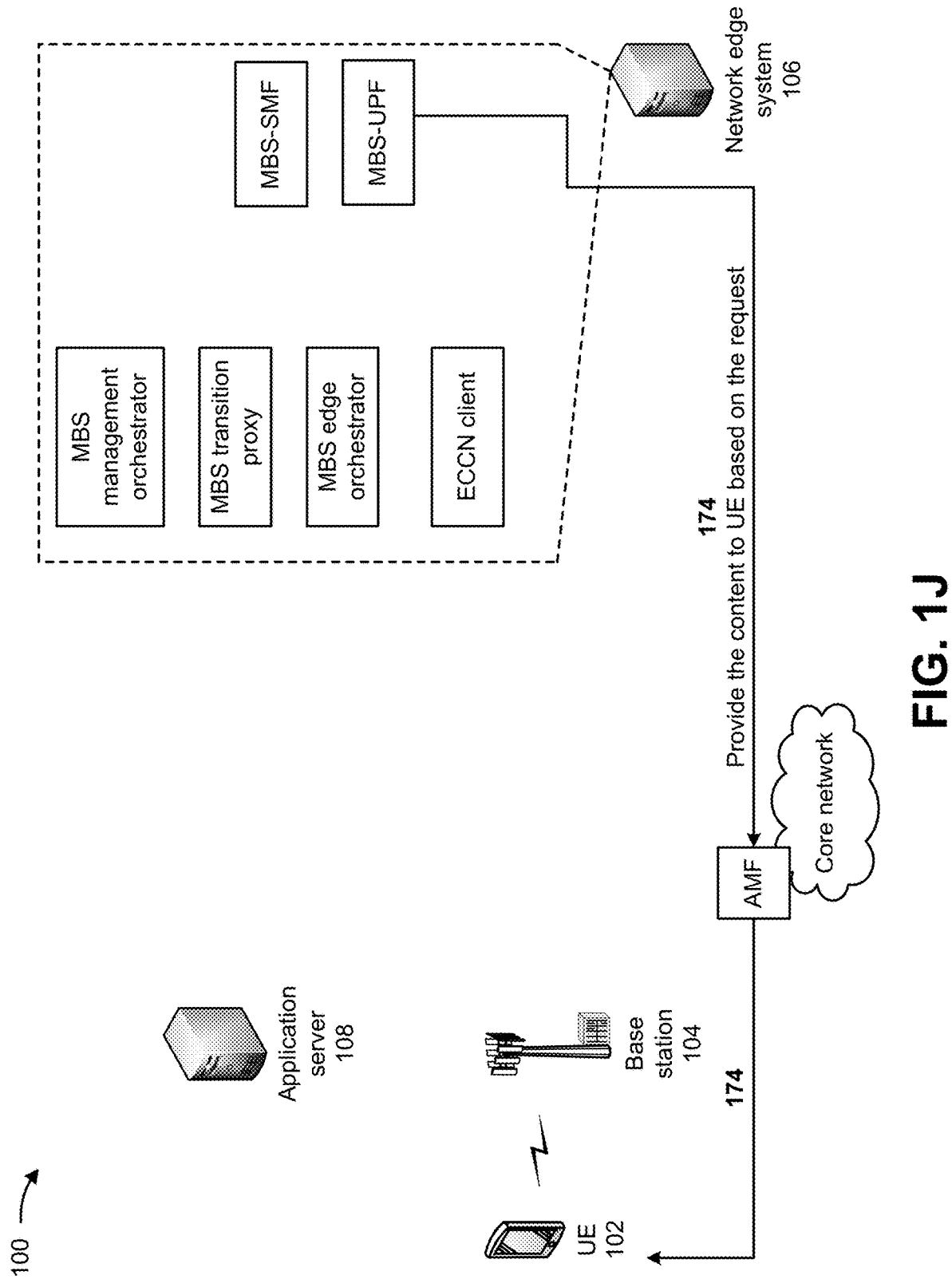

As shown in FIG. 1J, and by reference number 174, the MBS-UPF of the network edge system 106 may provide the content to the UE 102, via the AMF of the core network, based on the request for the content. For example, the MBS-UPF of the network edge system 106 may provide the content to the AMF of the core network based on the request for the content. The AMF may provide the content to the UE 102, and the UE 102 may receive the content. In some implementations, the mobile device middleware may tune to a bearer and may provide the content to the UE 102 once the content is available. If the content becomes more popular across locations within a same edge coverage area, more MBS core functions may be added for the MBS.

Figure 1K:
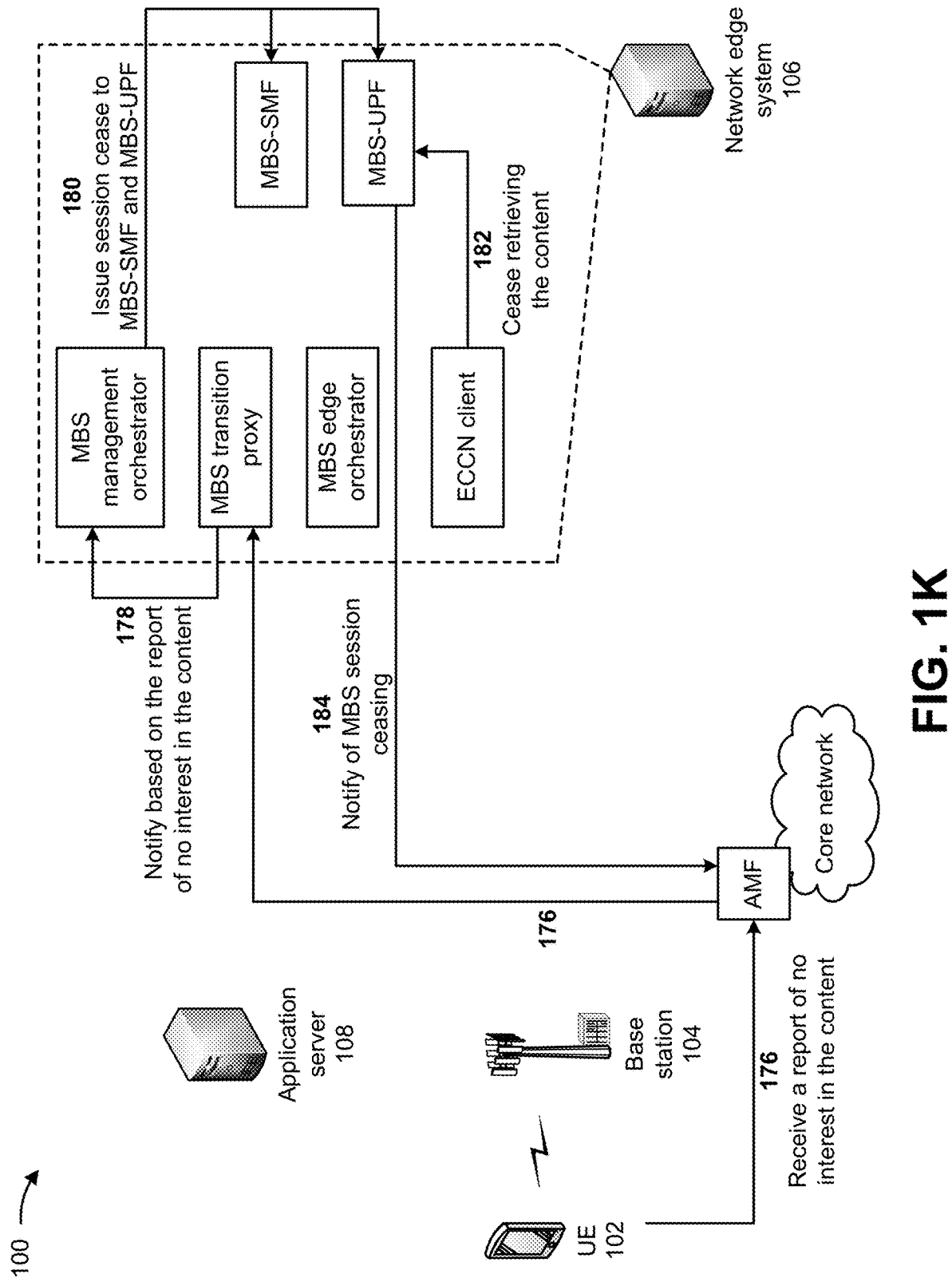

As shown in FIG. 1K, and by reference number 176, the MBS transition proxy of the network edge system 106 may receive, from the UE 102 and via the AMF of the core network, a report of no interest in the content. For example, once the content ceases or is no longer consumed by the UE 102, the mobile application may generate the report of no interest in the content. The UE 102 may provide the report of no interest in the content to the AMF of the core network, and the AMF may provide the report of no interest in the content to the MBS transition proxy of the network edge system 106. The MBS transition proxy may receive the report of no interest in the content. In some implementations, the MBS transition proxy may determine whether an interest level in the content falls below a threshold level, and may determine that there is no interest in the content when the interest level falls below the threshold level.

As further shown in FIG. 1K, and by reference number 178, the MBS transition proxy of the network edge system 106 may notify the MBS management orchestrator based on the report of no interest in the content. For example, based on receiving the report of no interest in the content, the MBS transition proxy may generate a notification indicating no interest in the content and may provide the notification to the MBS management orchestrator of the network edge system 106. The MBS management orchestrator may receive the notification from the MBS transition proxy.

As further shown in FIG. 1K, and by reference number 180, the MBS management orchestrator of the network edge system 106 may issue a session cease to the MBS-SMF and the MBS-UPF. For example, based on receiving the notification indicating no interest in the content, the MBS management orchestrator of the network edge system 106 may generate an MBS session cease command, and may provide the MBS session cease command to the MBS-SMF and the MBS-UPF. The MBS-SMF and the MBS-UPF may receive the MBS session cease command from the MBS management orchestrator. The MBS cease command may cause the MBS-SMF and the MBS-UPF to cease the MBS session.

As further shown in FIG. 1K, and by reference number 182, the MBS-UPF of the network edge system 106 may cease receiving the content from the ECCN client. For example, based on the MBS session cease command, the MBS-UPF of the network edge system 106 may cease requesting and receiving the content from the ECCN client.

As further shown in FIG. 1K, and by reference number 184, the MBS-UPF of the network edge system 106 may notify the AMF of the MBS session cease. For example, after ceasing receipt of the content from the ECCN client, the MBS-UPF of the network edge system 106 may generate a notification of the MBS session cease. The MBS-UPF may provide the notification of the MBS session cease (e.g., via the control plane) to the AMF of the core network, the base station 104, and/or the like.

Figure 1L:
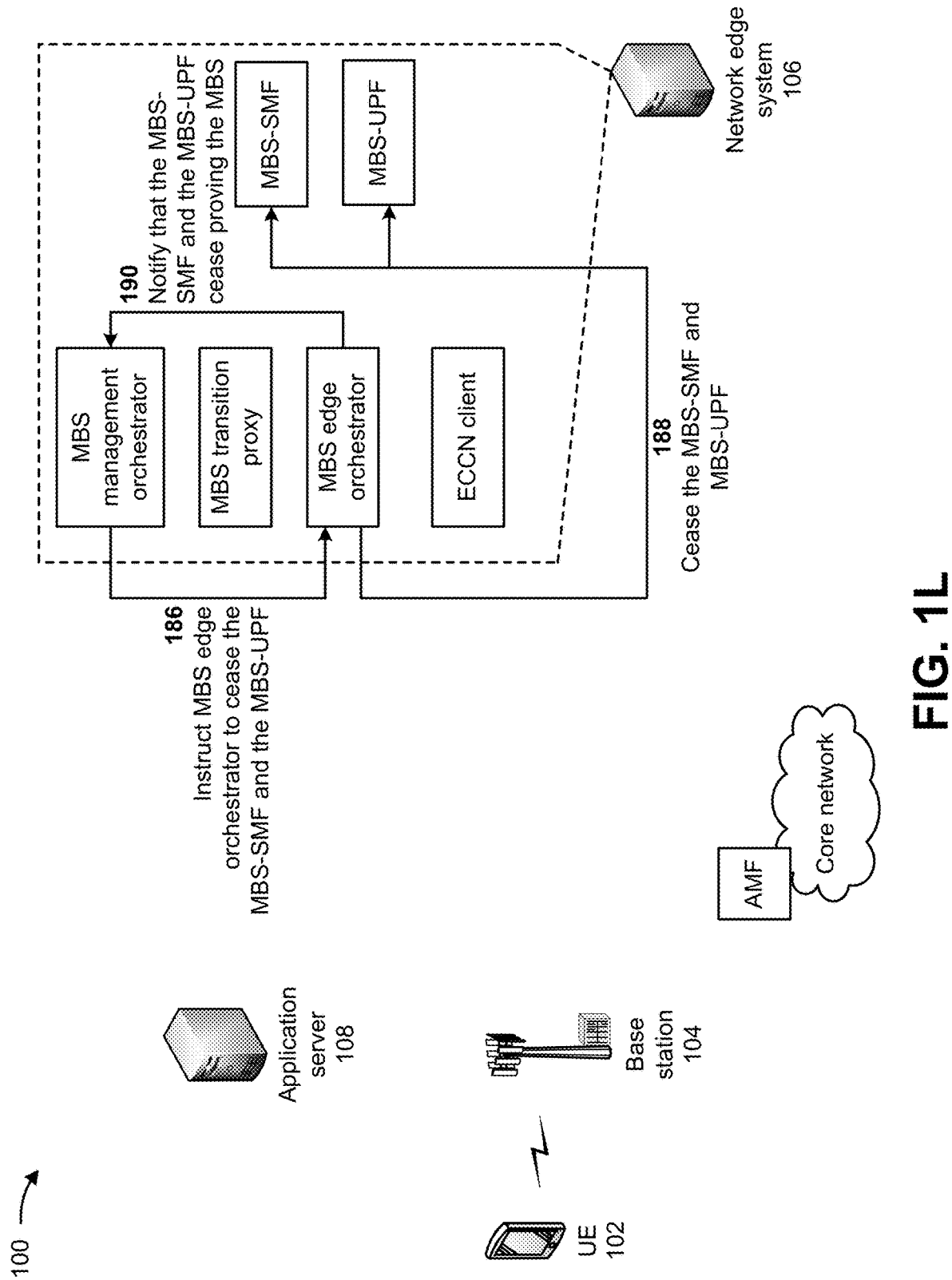

As shown in FIG. 1L, and by reference number 186, the MBS management orchestrator of the network edge system 106 may instruct the MBS edge orchestrator to cease the MBS-SMF and the MBS-UPF. For example, based on receiving the notification indicating no interest in the content, the MBS management orchestrator of the network edge system 106 may instruct the MBS edge orchestrator to cease the MBS core functions (e.g., the MBS-SMF and the MBS-UPF) if no other MBS sessions are executing on the MBS core functions.

As further shown in FIG. 1L, and by reference number 188, the MBS edge orchestrator of the network edge system 106 may cease the MBS-SMF and the MBS-UPF. For example, based on the instruction received from the MBS management orchestrator, the MBS edge orchestrator of the network edge system 106 may instruct the MBS-SMF and the MBS-SMF to cease providing the MBS. The MBS-SMF and the MBS-UPF may cease providing the MBS based on the instruction received from the MBS edge orchestrator.

As further shown in FIG. 1L, and by reference number 190, the MBS edge orchestrator of the network edge system 106 may notify the MBS management orchestrator that the MBS-SMF and the MBS-UPF ceased providing the MBS. For example, once the MBS-SMF and the MBS-SMF cease providing the MBS, the MBS edge orchestrator may generate a notification indicating that the MBS-SMF and the MBS-UPF ceased providing the MBS. The MBS edge orchestrator may provide the notification to the MBS edge orchestrator.

In this way, the network edge system 106 provides dynamic edge-based MBS for content providers. For example, the network edge system 106 may provide an edge-based complementary system with defined communication methods that facilitate intelligent decision making that enables either 5G MBS or edge content caching at appropriate times. In a real-time video streaming scenario, the network edge system 106 may deploy both technologies in a 5G network in a codependent manner, where edge content caching traffic may be monitored and may provide thresholds to trigger an MBS based on consumption patterns, thus reducing over-the-air network congestion and providing high quality and low latency to consumers. Thus, the network edge system 106 may conserve computing resources, networking resources, and/or other resources that would have otherwise been consumed by inefficiently providing content to multiple users in a particular location that are all interested in viewing the same content at the same time, utilizing unicast transport of content to multiple users in a particular location, independently utilizing 5G MBS and edge content caching, providing a poor user experience to multiple users requesting the same content, and/or the like.

As indicated above, FIGS. 1A-1L are provided as an example. Other examples may differ from what is described with regard to FIGS. 1A-1L. The number and arrangement of devices shown in FIGS. 1A-1L are provided as an example. In practice, there may be additional devices, fewer devices, different devices, or differently arranged devices than those shown in FIGS. 1A-1L. Furthermore, two or more devices shown in FIGS. 1A-1L may be implemented within a single device, or a single device shown in FIGS. 1A-1L may be implemented as multiple, distributed devices. Additionally, or alternatively, a set of devices (e.g., one or more devices) shown in FIGS. 1A-1L may perform one or more functions described as being performed by another set of devices shown in FIGS. 1A-1L.

Figure 2:
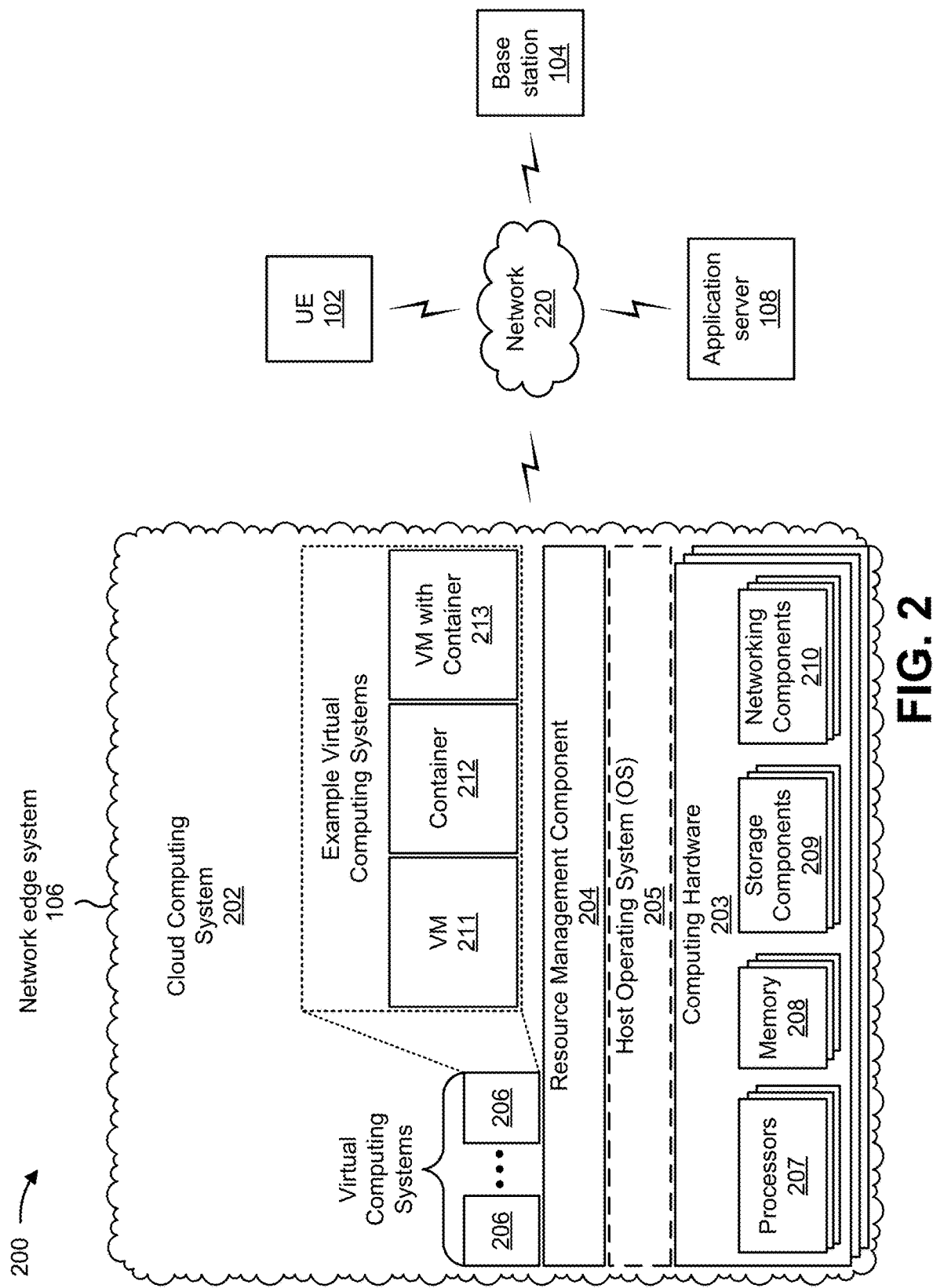
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the network edge system 106, which may include one or more elements of and/or may execute within a cloud computing system 202. The cloud computing system 202 may include one or more elements 203-213, as described in more detail below. As further shown in FIG. 2, the environment 200 may include the UE 102, the base station 104, the application server 108, and/or a network 220. Devices and/or elements of the environment 200 may interconnect via wired connections and/or wireless connections.

The UE 102 includes one or more devices capable of receiving, generating, storing, processing, and/or providing information, such as information described herein. For example, the UE 102 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The base station 104 includes one or more devices capable of transferring traffic, such as audio, video, text, and/or other traffic, destined for and/or received from a UE. For example, the base station 104 may include an eNodeB (eNB) associated with a long term evolution (LTE) network that receives traffic from and/or sends traffic to a core network, a gNodeB (gNB) associated with a RAN of a fifth generation (5G) network, a base transceiver station, a radio base station, a base station subsystem, a cellular site, a cellular tower, an access point, a transmit receive point (TRP), a radio access node, a macrocell base station, a microcell base station, a picocell base station, a femtocell base station, and/or another network entity capable of supporting wireless communication. The base station 104 may support, for example, a cellular radio access technology (RAT). The base station 104 may transfer traffic between a UE (e.g., using a cellular RAT), one or more other base stations 104 (e.g., using a wireless interface or a backhaul interface, such as a wired backhaul interface), and/or a core network. The base station 104 may provide one or more cells that cover geographic areas.

The application server 108 may include one or more devices capable of receiving, generating, storing, processing, providing, and/or routing information, as described elsewhere herein. The application server 108 may include a communication device and/or a computing device. For example, the application server 108 may include a server, such as an application server, a client server, a web server, a database server, a host server, a proxy server, a virtual server (e.g., executing on computing hardware), or a server in a cloud computing system. In some implementations, the application server 108 may include computing hardware used in a cloud computing environment.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using the computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the network edge system 106 may include one or more elements 203-213 of the cloud computing system 202, may execute within the cloud computing system 202, and/or may be hosted within the cloud computing system 202, in some implementations, the network edge system 106 may not be cloud-based (e.g., may be implemented outside of a cloud computing system) or may be partially cloud-based. For example, the network edge system 106 may include one or more devices that are not part of the cloud computing system 202, such as the device 300 of FIG. 3, which may include a standalone server or another type of computing device. The network edge system 106 may perform one or more operations and/or processes described in more detail elsewhere herein.

The network 220 may include one or more wired and/or wireless networks. For example, the network 220 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. The network 220 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
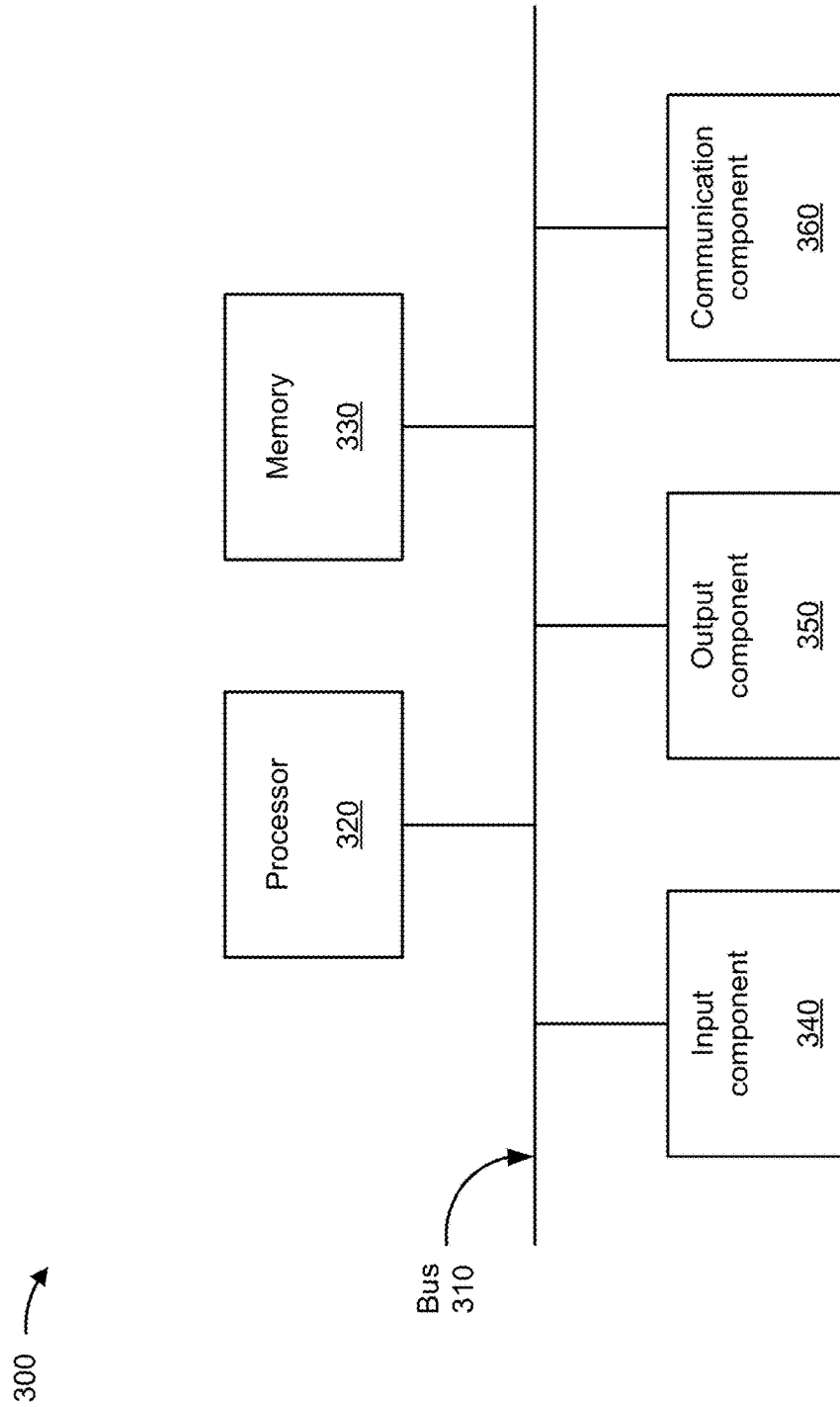
FIG. 3 is a diagram of example components of one or more devices of FIG. 2.

FIG. 3 is a diagram of example components of a device 300, which may correspond to the UE 102, the base station 104, the network edge system 106, and/or the application server 108. In some implementations, the UE 102, the base station 104, the network edge system 106, and/or the application server 108 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hard-wired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
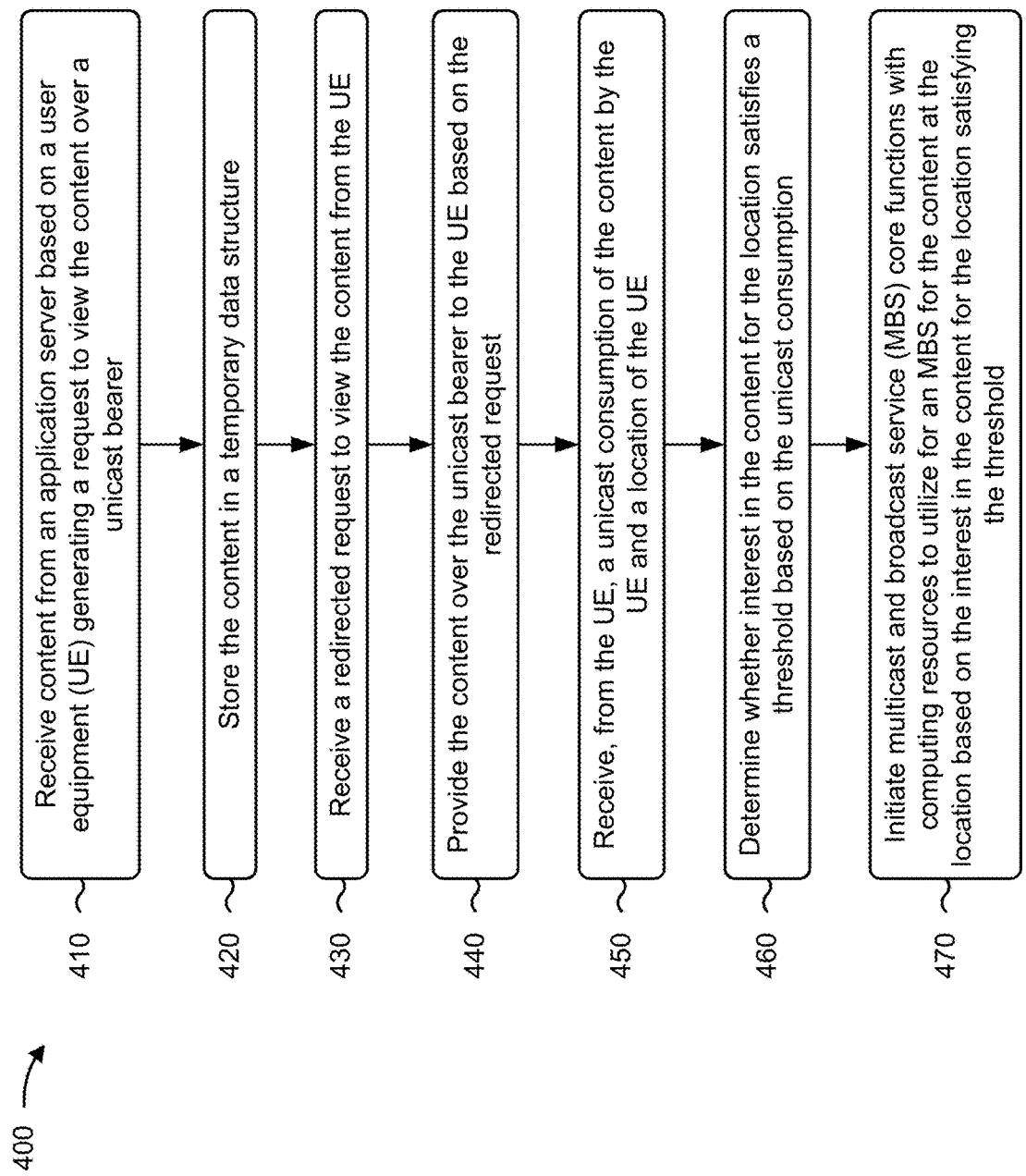
FIG. 4 is a flowchart of an example process for providing dynamic edge-based MBS for content providers.

FIG. 4 is a flowchart of an example process 400 for providing dynamic edge-based MBS for content providers. In some implementations, one or more process blocks of FIG. 4 may be performed by a device (e.g., the network edge system 106). In some implementations, one or more process blocks of FIG. 4 may be performed by another device or a group of devices separate from or including the device, such as a UE (e.g., the UE 102), a base station (e.g., the base station 104), and/or an application server (e.g., the application server 108). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving content from an application server based on a UE generating a request to view the content over a unicast bearer (block 410). For example, the device may receive content from an application server based on a UE generating a request to view the content over a unicast bearer, as described above.

As further shown in FIG. 4, process 400 may include storing the content in a temporary data structure (block 420). For example, the device may store the content in a temporary data structure, as described above.

As further shown in FIG. 4, process 400 may include receiving a redirected request to view the content from the UE (block 430). For example, the device may receive a redirected request to view the content from the UE, as described above.

As further shown in FIG. 4, process 400 may include providing the content over the unicast bearer to the UE based on the redirected request (block 440). For example, the device may provide the content over the unicast bearer to the UE based on the redirected request, as described above. In some implementations, providing the content over the unicast bearer to the UE includes providing the content over the unicast bearer to the UE from the temporary data structure.

As further shown in FIG. 4, process 400 may include receiving, from the UE, a unicast consumption of the content by the UE and a location of the UE (block 450). For example, the device may receive, from the UE, a unicast consumption of the content by the UE and a location of the UE, as described above.

As further shown in FIG. 4, process 400 may include determining whether interest in the content for the location satisfies a threshold based on the unicast consumption (block 460). For example, the device may determine whether interest in the content for the location satisfies a threshold based on the unicast consumption, as described above. In some implementations, determining whether the interest in the content for the location satisfies the threshold includes determining, by an MBS transition proxy of the device, whether the interest in the content for the location satisfies the threshold based on the unicast consumption.

As further shown in FIG. 4, process 400 may include initiating MBS core functions with computing resources to utilize for an MBS for the content at the location based on the interest in the content for the location satisfying the threshold (block 470). For example, the device may initiate MBS core functions with computing resources to utilize for an MBS for the content at the location based on the interest in the content for the location satisfying the threshold, as described above. In some implementations, initiating the MBS core functions with the computing resources to utilize for the MBS for the content at the location includes initiating, by an MBS edge orchestrator of the device, the MBS core functions with the computing resources to utilize for the MBS for the content at the location.

In some implementations, process 400 includes provisioning the MBS core functions based on provisioning information, notifying the application server that the MBS is ready for the content at the location based on provisioning the MBS core functions, and instructing the MBS core functions to start the MBS for the content. In some implementations, process 400 includes receiving, from the user equipment, a request for the content, and providing the content to the user equipment based on the request for the content, via the MBS. In some implementations, the application server is configured to update a program guide for the content with an MBS configuration.

In some implementations, process 400 includes receiving, from the user equipment, a report of no interest in the content, issuing a session cease to the MBS core functions for the content based on the report of no interest in the content, and ceasing the MBS core functions from providing the MBS for the content based on the session cease. In some implementations, issuing the session cease to the MBS core functions for the content includes issuing, by an MBS management orchestrator of the device, the session cease to the MBS core functions for the content. In some implementations, ceasing the MBS core functions from providing the MBS for the content includes ceasing, by an MBS edge orchestrator of the device, the MBS core functions from providing the MBS for the content.

In some implementations, process 400 includes receiving, from the application server, characteristic data identifying characteristics of other content stored by the application server; providing TMGI and SDP information to the application server based on receiving the characteristic data; initiating, based on the characteristic data, the MBS core functions with computing resources to utilize to provide the MBS for the other content; notifying the application server that the MBS is ready for the other content; retrieving, from the application server, the other content for delivery over the MBS; and providing the other content to a plurality of user equipment via the MBS. In some implementations, the application server is configured to store the other content to be accessed via a network address. In some implementations, notifying the application server that the MBS is ready for the other content includes notifying, by an MBS management orchestrator of the device, the application server that the MBS is ready for the other content.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
  receiving, by a device, content from an application server based on a user equipment generating a request to view the content over a unicast bearer;
  storing, by the device, the content in a temporary data structure;
  receiving, by the device, a redirected request to view the content from the user equipment;
  providing, by the device, the content over the unicast bearer to the user equipment based on the redirected request;
  receiving, by the device and from the user equipment, a unicast consumption of the content by the user equipment and a location of the user equipment;
  determining, by the device, whether interest in the content for the location satisfies a threshold based on the unicast consumption;
  initiating, by the device, multicast and broadcast service (MBS) core functions with computing resources to utilize for an MBS for the content at the location based on the interest in the content for the location satisfying the threshold; and
  notifying the application server that the MBS is ready for the content at the location based on provisioning the MBS core functions.

2. The method of claim 1, wherein providing the content over the unicast bearer to the user equipment comprises:
  providing the content over the unicast bearer to the user equipment from the temporary data structure.

3. The method of claim 1, further comprising:
  provisioning the MBS core functions based on provisioning information; and
  instructing the MBS core functions to start the MBS for the content.

4. The method of claim 3, further comprising:
  receiving, from the user equipment, a request for the content; and
  providing the content to the user equipment based on the request for the content, via the MBS.

5. The method of claim 3, wherein the application server is configured to update a program guide for the content with an MBS configuration.

6. The method of claim 1, wherein determining whether the interest in the content for the location satisfies the threshold comprises:
determining, by an MBS transition proxy of the device, whether the interest in the content for the location satisfies the threshold based on the unicast consumption.

7. The method of claim 1, wherein initiating the MBS core functions with the computing resources to utilize for the MBS for the content at the location comprises:
initiating, by an MBS edge orchestrator of the device, the MBS core functions with the computing resources to utilize for the MBS for the content at the location.

8. A device, comprising:
one or more processors configured to:
receive content from an application server based on a user equipment generating a request to view the content over a unicast bearer;
store the content in a temporary data structure;
receive a redirected request to view the content from the user equipment;
provide the content over the unicast bearer to the user equipment based on the redirected request;
receive, from the user equipment, a unicast consumption of the content by the user equipment and a location of the user equipment;
determine whether interest in the content for the location satisfies a threshold based on the unicast consumption;
initiate multicast and broadcast service (MBS) core functions with computing resources to utilize for an MBS for the content at the location based on the interest in the content for the location satisfying the threshold;
provision the MBS core functions based on provisioning information;
notify the application server that the MBS is ready for the content at the location based on provisioning the MBS core functions; and
instruct the MBS core functions to start the MBS for the content.

9. The device of claim 8, wherein the one or more processors are further configured to:
receive, from the user equipment, a report of no interest in the content;
issue a session cease to the MBS core functions for the content based on the report of no interest in the content; and
cease the MBS core functions from providing the MBS for the content based on the session cease.

10. The device of claim 9, wherein the one or more processors, to issue the session cease to MBS core functions for the content, are configured to:
issue, by an MBS management orchestrator of the device, the session cease to the MBS core functions for the content.

11. The device of claim 9, wherein the one or more processors, to cease the MBS core functions from providing the MBS for the content, are configured to:
cease, by an MBS edge orchestrator of the device, the MBS core functions from providing the MBS for the content.

12. The device of claim 8, wherein the one or more processors are further configured to:

receive, from the application server, characteristic data identifying characteristics of other content stored by the application server;
provide temporary mobile group identity (TMGI) and session description protocol (SDP) information to the application server based on receiving the characteristic data;
initiate, based on the characteristic data, the MBS core functions with computing resources to utilize to provide the MBS for the other content;
notify the application server that the MBS is ready for the other content;
retrieve, from the application server, the other content for delivery over the MBS; and
provide the other content to a plurality of user equipment via the MBS.

13. The device of claim 12, where the application server is configured to store the other content to be accessed via a network address.

14. The device of claim 12, wherein the one or more processors, to notify the application server that the MBS is ready for the other content, are configured to:
notify, by an MBS management orchestrator of the device, the application server that the MBS is ready for the other content.

15. A non-transitory computer-readable medium storing a set of instructions, the set of instructions comprising:
one or more instructions that, when executed by one or more processors of a device, cause the device to:
receive content from an application server based on a user equipment generating a request to view the content over a unicast bearer;
store the content in a temporary data structure;
receive a redirected request to view the content from the user equipment;
provide the content over the unicast bearer to the user equipment based on the redirected request;
receive, from the user equipment, a unicast consumption of the content by the user equipment and a location of the user equipment;
determine whether interest in the content for the location satisfies a threshold based on the unicast consumption;
initiate multicast and broadcast service (MBS) core functions with computing resources to utilize for an MBS for the content at the location based on the interest in the content for the location satisfying the threshold;
instruct the MBS core functions to start the MBS for the content; and
issue a session cease to the MBS core functions for the content based on a report of no interest in the content.

16. The non-transitory computer-readable medium of claim 15, wherein the one or more instructions further cause the device to:
receive, from the user equipment, a request for the content; and
provide the content to the user equipment based on the request for the content, via the MBS.

17. The non-transitory computer-readable medium of claim 15, wherein the one or more instructions further cause the device to:
receive, from the user equipment, the report of no interest in the content; and
cease the MBS core functions from providing the MBS for the content based on the session cease.

18. The non-transitory computer-readable medium of claim 17, wherein the one or more instructions, that cause the device to issue the session cease to MBS core functions for the content, cause the device to:

issue, by an MBS management orchestrator of the device, the session cease to the MBS core functions for the content.

19. The non-transitory computer-readable medium of claim 17, wherein the one or more instructions, that cause the device to cease the MBS core functions from providing the MBS for the content, cause the device to:

cease, by an MBS edge orchestrator of the device, the MBS core functions from providing the MBS for the content.

20. The non-transitory computer-readable medium of claim 15, wherein the one or more instructions further cause the device to:

receive, from the application server, characteristic data identifying characteristics of other content stored by the application server;

provide temporary mobile group identity (TMGI) and session description protocol (SDP) information to the application server based on receiving the characteristic data;

initiate, based on the characteristic data, the MBS core functions with computing resources to utilize to provide an MBS for the other content;

notify the application server that the MBS is ready for the other content;

retrieve, from the application server, the other content for delivery over the MBS; and provide the other content to a plurality of user equipment via the MBS.

\* \* \* \* \*